Patented Sept. 26, 1950

2,523,745

UNITED STATES PATENT OFFICE 2,523,745

SYNTHESIS OF LYSINE INTERMEDIATE

Donald T. Warner and Owen A. Moe, Minneapolis, Minn., assignors to General Mills, Inc., a corporation of Delaware No Drawing. Application February 24, 1948, Serial No. 10,556

7 Claims. (Cl. 260—482)

The present invention relates to an intermediate useful in the synthesis of lysine and to a process of producing this intermediate.

The intermediates contemplated by the present invention have the following structural formula:

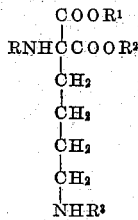

in which R and $R^3$ are acyl groups and $R^1$ and $R^2$ are low aliphatic groups. These intermediates can be readily converted to lysine by decarboxylating and hydrolyzing them. This may be accomplished in a single step, as for example, by acid hydrolysis, or the steps involving decarboxylation and hydrolysis may be separated.

It is, therefore, an object of the present invention to provide a novel intermediate useful for the synthesis of lysine.

It is a further object of the present invention to provide a process of producing such intermediate.

The intermediates of the present invention may be prepared from aldehydes having the following formula:

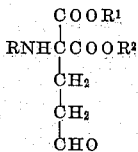

where R, $R^1$, and $R^2$ are as above described. These aldehydes may be prepared as disclosed in our copending application, Serial No. 648,020, filed February 15, 1946, now abandoned, and entitled Aldehydo Compounds and Processes of Producing the Same of which this application is a continuation-in-part. According to this application, aldehydes of this type, for example, gamma-acetamido-gamma, gamma-dicarbethoxy butyraldehyde, may be prepared by the 1,4 addition of ethyl acetamido malonate to acrolein in the presence of a small quantity of alkaline catalyst.

The synthesis of the intermediate of the present invention starting with such aldehydes is as follows:

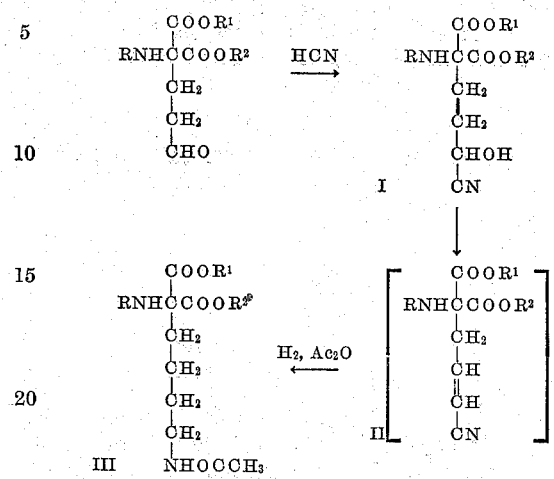

The preparation of the cyanohydrin I of the aldehyde compound may be readily accomplished by treatment with HCN. The addition of liquid hydrogen cyanide to a solution of the aldehydo compound in benzene yielded the cyanohydrin I, which was deposited as a white crystalline material when the reaction mixture was cooled. However, it was not necessary to isolate the cyanohydrin I as a crystalline material and either a benzene solution of I or the crude oily product (I) could be heated with acetic anhydride. The unsaturated nitrile II was formed and it was isolated as a residual viscous oil. The unsaturated nitrile II was readily reduced in presence of $PtO_2$ and acetic anhydride to yield the diacetamido compound III. This reductive acetylation procedure proceeded in the following manner: the carbon to carbon double bond was immediately hydrogenated and at the same time the nitrile group was reduced to an amine group which was acetylated as rapidly as it formed in the presence of the acetic anhydride.

According to this procedure, the cyanohydrin is treated with acetic anhydride and the resulting reaction mixture is warmed for a period of one hour. The evaporation of the resulting solution yields the unsaturated nitrile II as an oil, This compound is then catalytically reduced in the presence of acetic anhydride with platinum oxide, at approximately 1300 pounds pressure. After the reduction is complete, the reaction mixture may be filtered and filtrate concentrated in vacuo to a viscous oil. This viscous oil crystallizes partially and crystallization may be facilitated by dilution with an ether. The crystalline product thus obtained melts at 127–130° C. and after crystallization from benzene-alcohol it melts at 132.5–133.5° C. Analysis of this product indicates this product to be the diacetamido intermediate III in which R and $R^3$ are acetyl and $R^1$ and $R^2$ are ethyl.

This procedure is very simple and applicable to commercial production since only one isolation of an intermediate product is necessary before the final hydrolysis step of intermediate III to lysine.

As an alternative, the cyanohydrin may be dehydrated directly, as for example, with such acid dehydrating agents as phosphorus oxychloride or thionyl chloride to remove a molecule of water and produce a carbon to carbon double bond. This unsaturated nitrile II is isolated as a viscous oil and may be hydrogenated in the presence of a catalyst and in the presence of an acid anhydride such as acetic anhydride to saturate the double bond, reduce the nitrile to an amine, and acetylate the amine as previously discussed.

The following examples will serve to illustrate the invention:

EXAMPLE 1

A. *Preparation of gama-acetamido-gamma, gamma-dicarbethoxy-butyraldehyde*

To an alcoholic solution consisting of 125 ml. of absolute ethanol and 0.15 g. of sodium was added ethyl acetamidomalonate (108.5 g.). The resulting slurry was cooled to 15° C. Then the acrolein (35 ml.) was added dropwise over a period of one hour. The reaction temperature was maintained at 20–25° C. The reaction mixture was stirred for an additional hour and then permitted to stand at room temperature for an additional 4-hour period. This reaction mixture containing the gamma-acetamido-gamma, gamma-dicarbethoxy butyraldehyde was used directly in the preparation of the cyanohydrin as described below.

B. *Preparation of cyanohydrin of above aldehydo compound*

The above reaction mixture containing an intermediate aldehydo compound was diluted with alcohol until a total volume of 365 ml. was obtained. This alcoholic solution was cooled in an ice bath to 5° C. and 34 ml. of liquid HCN (cooled to 5° C.) were added. The addition of the HCN increased the temperature of the reaction mixture to 9° C. After stirring for one-half hour in an ice bath, 6 drops of 50% KOH were added. No further increase in the temperature was noted. This reaction mixture was placed in the refrigerator for a period of 16 hours after which it was acidified with 0.4 ml. of 85% phosphoric acid. After acidification the reaction mixture was concentrated in vacuo at about 80° C. The resulting viscous syrup was treated with 150 ml. of benzene and concentrated in vacuo. This treatment was repeated again, and after the addition of 200 ml. of benzene some inorganic material was removed by filtration. The filtrate thus obtained was employed directly in the acetylation of the cyanohydrin as described below.

C. *Acetylation and reduction of the cyanohydrin product*

The above benzene solution containing the cyanohydrin was concentrated in vacuo to yield a viscous syrup. The viscous residue thus obtained was treated with 150 ml. of benzene and 100 ml. of acetic anhydride. The resulting clear orange solution was refluxed for 2¼ hours and then permitted to stand at room temperature over night. The reaction mixture was again concentrated in vacuo and a residual viscous oil was obtained. This oil was mixed with acetic anhydride (total volume 290 ml.), and 3 g. of platinum oxide were added. The reaction mixture was diluted with an additional 60 ml. of acetic anhydride (total volume 350 ml.). The reduction was carried out at an initial pressure of 1500 pounds of hydrogen. When the hydrogenation was complete the catalyst was removed by filtration and the filtrate was concentrated in vacuo. The residue was treated with 250 ml. of benzene and again concentrated in vacuo to a syrup. This syrupy product partially crystallized and it was diluted with 500 ml. of ether. The formation of a copious quantity of precipitate occurred, and the reaction mixture was further diluted with 250 ml. of benzene. The resulting reaction mixture was permitted to cool in the refrigerator overnight and then the white crystalline product was collected by filtration. The dried product weighed approximately 68 g. and melted at 127–30° C. After purification by crystallization from benzene-alcohol, the product melted at 132.5–133.5° C. Analysis calc. for $C_{15}H_{26}O_6N_2$: 54.51; H. 7.93; N, 8.48; found: C, 54.28; H, 7.60; N, 8.58.

D. *Hydrolysis of the reduced product (compound III)*

Fifteen grams of the above reduction product were mixed with 100 ml. of concentrated hydrochloric acid. The reaction mixture was refluxed for a period of 20 hours and the resulting clear light yellow solution was concentrated in vacuo to yield a thick syrup. Twenty ml. of absolute ethanol were added and the concentration in vacuo was repeated. A solid crystalline cake was obtained after this evaporation. The crystalline product was mixed with 105 ml. of 95% ethanol and heated to boiling. The solid material dissolved completely to yield a clear light brown solution. This reaction mixture was treated with about 0.2 g. of activated carbon and filtration yielded a light yellow filtrate. After cooling to 20° C., absolute ether was added in small portions until a light permanent turbidity resulted. The addition of ether was continued until 70 ml. had been added. The crystalline product obtained in this manner was collected by filtration and melted at 175–180° C. After purification the lysine dihydrochloride thus obtained melted at 182.5–186° C. The dl-lysine dihydrochloride was converted to the monohydrochloride in the following manner:

2.9 g. of the dihydrochloride were dissolved in 55 ml. of boiling 95% ethanol. 1.4 g. of pyridine dissolved in 6 ml. of 95% alcohol were added to the boiling solution. Immediate turbidity was noted. Cooling yielded a crystalline monohydrochloride which was collected by filtration and melted at 256–258° C. with decomposition. Recrystallization from water by the addition of 95% ethanol increased the melting point to 257–258° C. with decomposition.

The dihydrochloride was also converted to the dipicrate in the following manner:

4.4 g. of the dihydrochloride dissolved in 25 ml. of water were treated with 10 g. of picric acid in 250 ml. of water. The resulting mixture was warmed to maintain a homogeneous solution as it was further diluted to a total volume of 450 ml. The picrate was collected by filtration and purified by crystallization from water and it melted at 184.5–186.5° C. It was possible to convert both the monohydrochloride and the dipicrate to the dihydrochloride by treatment with hydrochloric acid.

The monohydrochloride of dl-lysine was converted to the dibenzoyl derivative in the following manner:

0.9 g. of the monohydrochloride dissolved in 5 ml. of water was treated with an alkaline solution containing 1.1 g. of sodium hydroxide in 9 ml. of water. Then 2.1 g. of benzoyl chloride were added, and after shaking for three minutes an additional quantity of aqueous sodium hydroxide containing 0.2 g. of sodium hydroxide in 4 ml. of water was added. After standing for 45 minutes the reaction mixture was acidified and the reaction product separated as a pasty solid. The product was collected by filtration and then suspended in a petroleum solvent, and the resulting mixture was boiled in order to remove the acidic components. The dibenzoyl derivative was obtained as a white powder and after recrystallization from aqueous ethanol it melted at 142–144° C. Further purification by recrystallization from aqueous ethanol yielded the pure dibenzoyl derivative of dl-lysine melting at 144.5–146° C. When this dibenzoyl derivative was mixed with an authentic sample there was no depression in the melting point. Analysis calc. for $C_{20}H_{22}O_4N_2$: C, 67.76; H, 6.27; N, 7.91; found: C, 68.01; H, 6.14; N, 7.85.

EXAMPLE 2

*Preparation of crystalline cyanohydrin I*

A benzene solution (225 cc.) of the aldehydo compound (0.25 mole) was mixed with 17 cc. of liquid hydrogen cyanide at 5° C. The temperature of the reaction mixture increased to 10° C. Then aqueous potassium hydroxide (6 drops of 50%) was added and the reaction mixture was placed in the refrigerator for 40 hours. After neutralization with 1 cc. of 85% phosphoric acid, the reaction mixture was placed in the refrigerator overnight. The white crystalline product, which had been deposited, was collected by filtration and dried. The yield of the crude cyanohydrin I, melting at 83.5–85° C., was 59.8 g. (approximately 80%). An analytical sample was prepared by two crystallizations from benzene (melting point 86.5–87.5° C.).

Anal. calcd. for $C_{13}H_{20}O_6N_2$: C, 52.00; H, 6.71; N, 9.33; found: C, 52.26; H, 6.72; N, 9.16.

*Dehydration of the intermediate cyanohydrin I with phosphorus oxychloride*

10 g. of the crystalline cyanohydrin I (melting point 86.5–88° C.) was dissolved in 15 cc. of benzene and 15 cc. of pyridine. Then 7 cc. of phosphorus oxychloride were added. The temperature rapidly increased to 50° C. and the reaction mixture was cooled in order to maintain the temperature within 40–50° C. The formation of a precipitate was noted almost at once. However, the reaction mixture was allowed to stand at room temperature overnight. After standing for 20 hours, the reaction mixture was poured into an excess of iced hydrochloric acid. 50 cc. of benzene were added and the benzene layer was collected and washed with sodium bicarbonate solution and water. Finally, the benzene solution was dried over anhydrous sodium sulfate. After filtration, the benzene filtrate was evaporated in vacuo and the residual oil weighed 6.2 g. The residual oil was dissolved in 40 cc. of acetic anhydride and approximately 0.5 g. of platinum oxide was added. The resulting reaction mixture was subjected to hydrogenation at room temperature at 1,300 pounds pressure. After 5 hours the hydrogenation appeared to be complete and the catalyst was removed by filtration. The filtrate was evaporated in vacuo and the residual oil was mixed with 200 cc. of ether and yielded an almost immediate precipitate. After cooling, the white precipitated product was collected by filtration and dried in vacuo. Five g. of the diacetamido compound III, melting at 128–130° C., was obtained. When recrystallized from benzene, the product melted sharply at 131.5–133° C. The melting point of this compound was not depressed when mixed with the sample of compound III prepared as previously discussed.

The use of compounds in which R and $R^3$ are acetyl and in which $R^1$ and $R^2$ are ethyl are preferred in view of the ready availability of ethyl malonic ester and of ethyl acetamido malonate. Similarly the reduction of the unsaturated nitrile compound proceeds readily in the presence of acetic anhydride to produce the amine and to acetylate it. It will be appreciated, however, that other compounds in which R and $R^3$ are other acyl groups may readily be prepared by the use of other reagents than the acetamido malonate and of other anhydrides than acetic anhydride during the reduction. Likewise other ester groups than ethyl esters may be employed, as for example, methyl, propyl, butyl, and the like, by first preparing such ester of malonic acid. It is to be understood, therefore, that the invention is not limited to the specific examples set forth, but other variations are possible without departing from the spirit of the invention.

We claim as our invention:

1. Compounds having the formula

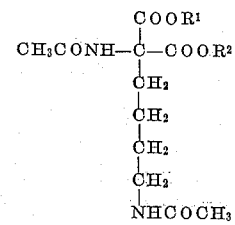

in which $R^1$ and $R^2$ are lower alkyl groups containing from one to four carbon atoms.

2. Process of producing compounds having the formula

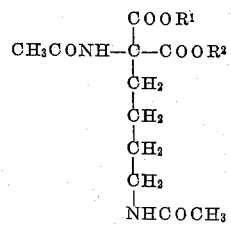

in which $R^1$ and $R^2$ are lower alkyl groups containing from one to four carbon atoms, which comprises reacting a compound having the formula

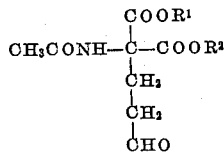

with HCN to produce the corresponding cyanohydrin, dehydrating the cyanohydrin to the corresponding unsaturated nitrile, and catalytically hydrogenating and acetylating the unsaturated nitrile to produce the above compound.

3. Process of producing compounds having the formula

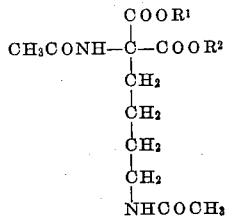

in which $R^1$ and $R^2$ are lower alkyl groups containing from one to four carbon atoms, which comprises reacting a compound having the formula

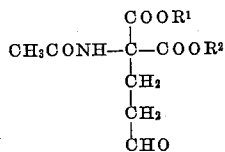

with HCN to produce the corresponding cyanohydrin, esterifying the hydroxyl group of said cyanohydrin, and catalytically hydrogenating the esterified product in the presence of organic acid anhydride to produce the above named compound.

4. Process of producing the following compound

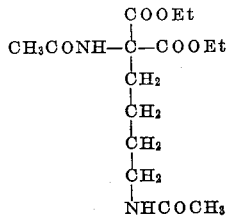

which comprises reacting gamma-acetamido-gamma, gamma-dicarbethoxy butyraldehyde with HCN to produce the corresponding cyanohydrin, reacting the cyanohydrin with acetic anhydride to esterify the hydroxyl group, and catalytically hydrogenating the resulting ester in the presence of acetic anhydride to produce the compound above named.

5. Process of producing the following compound

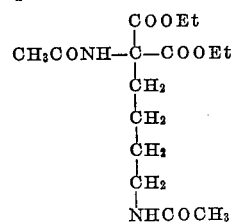

which comprises reacting gamma-acetamido-gamma, gamma-dicarbethoxy butyraldehyde with HCN to produce the corresponding cyanohydrin, dehydrating the cyanohydrin by means of phosphorus oxychloride to produce the corresponding unsaturated nitrile, and catalytically hydrogenating the unsaturated nitrile in the presence of acetic anhydride to produce the above named compound.

6. Process of producing compounds having the formula

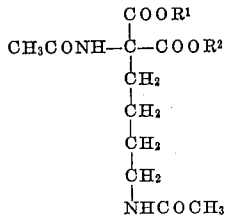

in which $R^1$ and $R^2$ are lower alkyl groups containing from one to four carbon atoms, which comprises reacting a compound having the formula

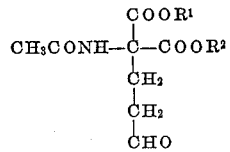

with HCN to produce the corresponding cyanohydrin, reacting cyanohydrin with an acidic dehydrating agent to remove a molecule of water and produce the corresponding unsaturated nitrile, and catalytically hydrogenating the unsaturated nitrile in the presence of an acid anhydride to produce the above named compound.

7. The compound having the formula

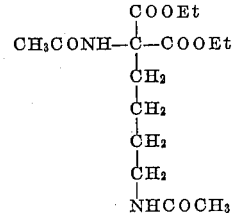

DONALD T. WARNER.
OWEN A. MOE.

No references cited.